(12) United States Patent
Ito et al.

(10) Patent No.: US 10,099,413 B2
(45) Date of Patent: Oct. 16, 2018

(54) RESIN-MOLDED COMPONENT

(71) Applicant: KOITO MANUFACTURING CO., LTD., Minato-ku, Tokyo (JP)

(72) Inventors: Hiroya Ito, Shizuoka (JP); Takatoshi Inoue, Shizuoka (JP); Tsukasa Ishiwata, Shizuoka (JP)

(73) Assignee: KOITO MANUFACTURING., LTD., Tokyo (JP)

( * ) Notice: Subject to any disclaimer, the term of this patent is extended or adjusted under 35 U.S.C. 154(b) by 0 days.

(21) Appl. No.: 15/366,114

(22) Filed: Dec. 1, 2016

(65) Prior Publication Data
US 2017/0157816 A1 Jun. 8, 2017

(30) Foreign Application Priority Data

Dec. 2, 2015 (JP) ................................ 2015-235858

(51) Int. Cl.
*B29C 45/00* (2006.01)
*B29C 45/16* (2006.01)
(Continued)

(52) U.S. Cl.
CPC .......... *B29C 45/1671* (2013.01); *B29C 45/16* (2013.01); *F21S 41/28* (2018.01);
(Continued)

(58) Field of Classification Search
CPC ..... B29C 45/1671; B29C 45/16; B29C 45/33; B29C 45/1675; B29C 45/14336;
(Continued)

(56) References Cited

U.S. PATENT DOCUMENTS 5,340,623 A * 8/1994 Menjo ..................... B60R 13/00
428/187
5,922,369 A 7/1999 Yanagihara et al.
(Continued)

FOREIGN PATENT DOCUMENTS

CN 1538107 A 10/2004
CN 105034253 A 11/2015
(Continued)

OTHER PUBLICATIONS

Ito, Hiroya (JP 2014-176974 A); (Sep. 2014) (JPP—machine translation to English).*
(Continued)

*Primary Examiner* — David Sample
*Assistant Examiner* — Donald M Flores, Jr.
(74) *Attorney, Agent, or Firm* — Sughrue Mion, PLLC

(57) ABSTRACT

A resin-molded component includes a first molding part, and a second molding part. A portion of the first molding part and a portion of the second molding part are laminated in a direction of connecting an outer surface and an inner surface of the resin-molded component to provide a laminated portion. A portion of the second molding part is provided as an exposed portion. Each of portions of the laminated portion is located at least on opposite sides across the exposed portion. A one-side surface of the exposed portion in the laminating direction of the laminated portion is configured as a portion of the outer surface and the other-side surface thereof is configured as a portion of the inner surface.

4 Claims, 11 Drawing Sheets

(51) Int. Cl.
 *F21S 41/20*  (2018.01)
 *B29K 67/00*  (2006.01)
 *B29K 59/00*  (2006.01)
 *B29L 31/30*  (2006.01)
 *B32B 3/02*  (2006.01)
 *B32B 27/08*  (2006.01)
 *B29C 45/33*  (2006.01)
 *B29L 31/00*  (2006.01)
 *B29C 45/14*  (2006.01)

(52) U.S. Cl.
 CPC .... *B29C 45/14336* (2013.01); *B29C 45/1675* (2013.01); *B29C 45/33* (2013.01); *B29C 2045/1682* (2013.01); *B29K 2059/00* (2013.01); *B29K 2067/00* (2013.01); *B29K 2995/002* (2013.01); *B29K 2995/0021* (2013.01); *B29K 2995/0025* (2013.01); *B29K 2995/0026* (2013.01); *B29L 2031/3005* (2013.01); *B29L 2031/747* (2013.01); *B32B 3/02* (2013.01); *B32B 27/08* (2013.01); *B32B 2250/02* (2013.01); *B32B 2250/24* (2013.01); *B32B 2307/41* (2013.01); *B32B 2307/412* (2013.01); *B32B 2605/08* (2013.01)

(58) Field of Classification Search
 CPC .... B29C 2045/1682; B29K 2995/0021; B29K 2995/0025; B29K 2067/00; B29K 2059/00; B29K 2995/002; B29K 2995/0026; B29L 2031/747; B29L 2031/3005; B32B 2605/08; B32B 2307/412; B32B 2307/41; B32B 2250/24; B32B 3/02; B32B 2250/02; B32B 27/08; F21S 48/1233; Y10T 428/24752; Y10T 428/24355

See application file for complete search history.

(56) References Cited

U.S. PATENT DOCUMENTS

| | | |
|---|---|---|
| 2004/0227270 A1 | 11/2004 | Takebe et al. |
| 2004/0227271 A1 | 11/2004 | Takebe et al. |
| 2005/0003159 A1 | 1/2005 | Ikeda et al. |
| 2014/0212621 A1* | 7/2014 | Blottiau ............... B29C 45/162 428/99 |
| 2015/0306801 A1 | 10/2015 | Ito et al. |

FOREIGN PATENT DOCUMENTS

| | | | | |
|---|---|---|---|---|
| JP | 2011187299 A | * | 9/2011 | ......... F21S 48/2212 |
| JP | 2014-176974 A | | 9/2014 | |
| JP | 2014176974 A | * | 9/2014 | ............ B29C 45/16 |

OTHER PUBLICATIONS

Takahashi, Yuki (JP 2011-187299 A); (Sep. 2011) (JPP—machine translation to English).*

Communication dated Jun. 26, 2018, issued by the Chinese Patent Office in counterpart Chinese Application No. 201611101927.X.

* cited by examiner

RESIN-MOLDED COMPONENT

CROSS-REFERENCE TO RELATED APPLICATION

The present application claims priority from Japanese Patent Application No. 2015-235858 filed on Dec. 2, 2015, the entire content of which is incorporated herein by reference.

BACKGROUND

Technical Field

The present invention relates to a resin-molded component which is formed by filling a first molten resin and a second molten resin into a cavity of a mold.

Patent Document 1: Japanese Patent Laid-Open Publication No. 2014-176974

Related Art

For example, as parts of a vehicle lamp, there are various parts such as a lamp housing having a light source disposed therein, a cover for covering the lamp housing, a reflector for reflecting light emitted from the light source, and an extension for achieving the improvement in appearance by shielding internal structures.

These parts of the vehicle lamp often use a resin-molded component which is molded by cooling the molten resin filled in a cavity of a mold having a core mold and a cavity mold (e.g., see Patent Document 1).

Patent Document 1 discloses a technique of filling a first molten resin and a second molten resin into a cavity of a mold and then molding a resin-molded component by a two-color molding. In the two-color molding disclosed in Patent Document 1, first, a first molten resin filled in a first cavity formed by a cavity mold and a first core mold is cooled to mold a primary molded component (first molding part), and then, the first core mold is opened with respect to the cavity mold, and then, a second core mold is clamped to the cavity mold in the state where the primary molded component is set. Subsequently, a second molten resin filled in a second cavity formed by the cavity mold and the second core mold is cooled to mold a second molding part. In this way, a resin-molded component composed of the first molding part and the second molding part is molded.

However, in the case where the resin-molded component is molded by the two-color molding as described above, air present in the second cavity or gas generated from the molten resin, or the like, is pushed to the outside by the second molten resin when the second molten resin is filled in the state where the primary molded component is molded. At this time, depending on the flowing state of the second molten resin or the shape of the primary molded component, or the like, the air or gas is not favorably pushed out, and thus, there is a risk that air bubbles occur between the primary molded component and the second molten resin.

In particular, air bubbles are liable to occur in an end portion in a flowing direction of the second molten resin or in a portion flowing along a convex portion or concave portion of the primary molded component.

The occurrence of such air bubbles becomes a factor of reducing the bonding area between the primary molded component (first molding part) and the second molding part formed by the cooling of the second molten resin. Thus, the bondability between the first molding part and the second molding part is lowered, which makes it difficult to ensure the high strength. Consequently, there is a risk that formability of the resin-molded component is lowered.

SUMMARY

Exemplary embodiments of the invention provide a resin-molded component which can achieve the improvement in formability by preventing the occurrence of air bubbles between the first molding part and the second molding part.

A resin-molded component, according to an exemplary embodiment, which is molded by filling a second molten resin in the state where a first molten resin is filled in a cavity of a mold and then cooled, the resin-molded component comprises: a first molding part molded by solidifying the first molten resin; and a second molding part molded by solidifying the second molten resin, wherein a portion of the first molding part and a portion of the second molding part are laminated in a direction of connecting an outer surface and an inner surface of the resin-molded component to provide a laminated portion, a portion of the second molding part is provided as an exposed portion, each of portions of the laminated portion is located at least on opposite sides across the exposed portion, and a one-side surface of the exposed portion in the laminating direction of the laminated portion is configured as a portion of the outer surface and the other-side surface thereof is configured as a portion of the inner surface.

In this way, the gas present in the cavity during the flowing of the second molten resin in the cavity is pushed to the molding surface side of the mold by the portion of the second molten resin forming the exposed portion.

Each of the portions of the laminated portion may be located only on opposite sides across the exposed portion.

In this way, the area of the second molten resin reaching the molding surface of the mold is increased.

The first molten resin may be a transparent resin and the second molten resin may be a colored resin.

In this way, a transparent portion, a colored portion and a laminated portion are formed in the resin-molded component.

The exposed portion may be provided in an end portion in a flowing direction of the second molten resin flowing when filled into the cavity.

In this way, the exposed portion is provided in a portion between the first molding part and the second molding part, in which air bubbles are liable to occur.

A convex portion protruding to one side or a concave portion opened to one side may be formed and the exposed portion may be provided in the convex portion or the concave portion.

In this way, the exposed portion is provided in a portion between the first molding part and the second molding part, in which air bubbles are liable to occur.

According to the present invention, the gas present in the cavity during the flowing of the second molten resin in the cavity is pushed to the molding surface side of the mold by the second molten resin. Therefore, the occurrence of air bubbles between the first molding part and the second molding part is prevented, and thus, it is possible to achieve the improvement in formability of the resin-molded component.

BRIEF DESCRIPTION OF THE DRAWINGS

FIG. 1 is a sectional view showing a state where a first molten rein is filled in a first cavity which is formed by clamping a cavity mold and a first core mold.

DETAILED DESCRIPTION

Figure 1:
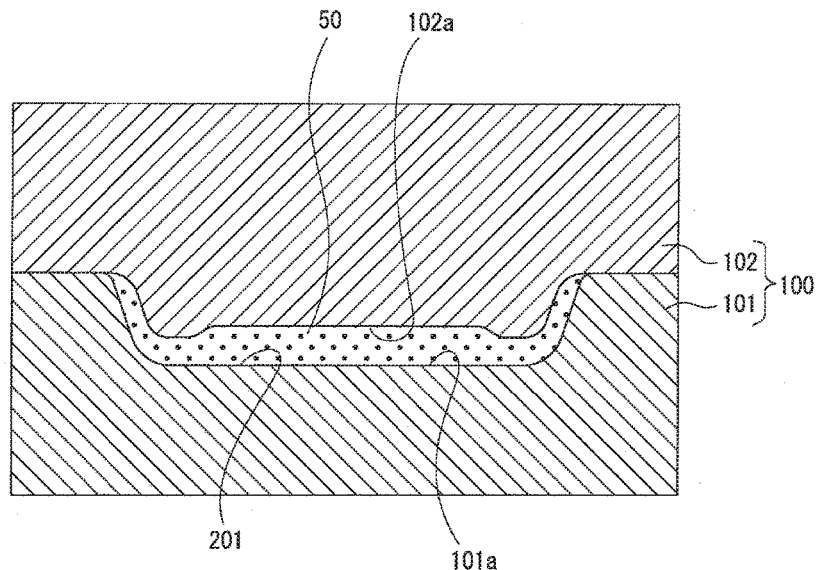
FIG. 1 shows a resin-molded component according to an exemplary embodiment of the present invention, together with FIGS. 2 to 20.
Figure 2:
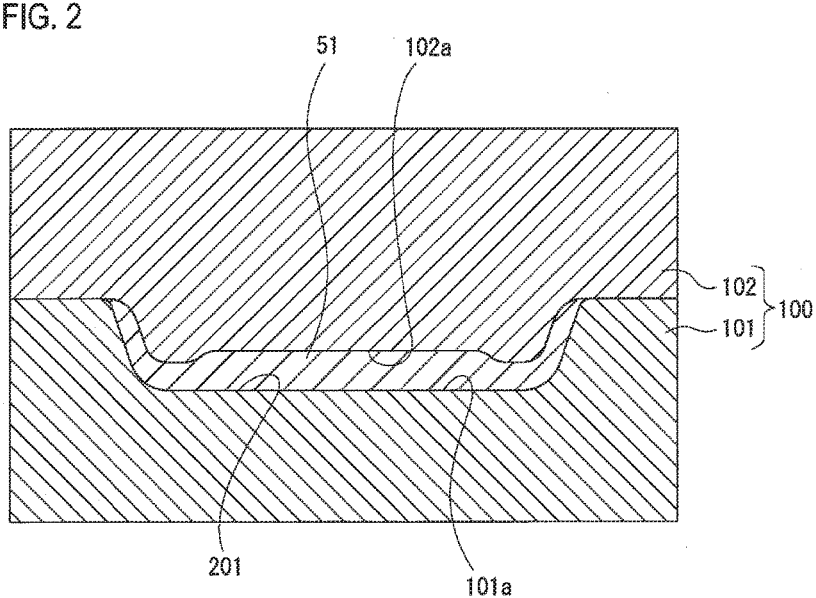
FIG. 2 continues to FIG. 1 and is a sectional view showing a state where the first molten resin is cooled, and thus, a first molding part is molded.
Figure 3:
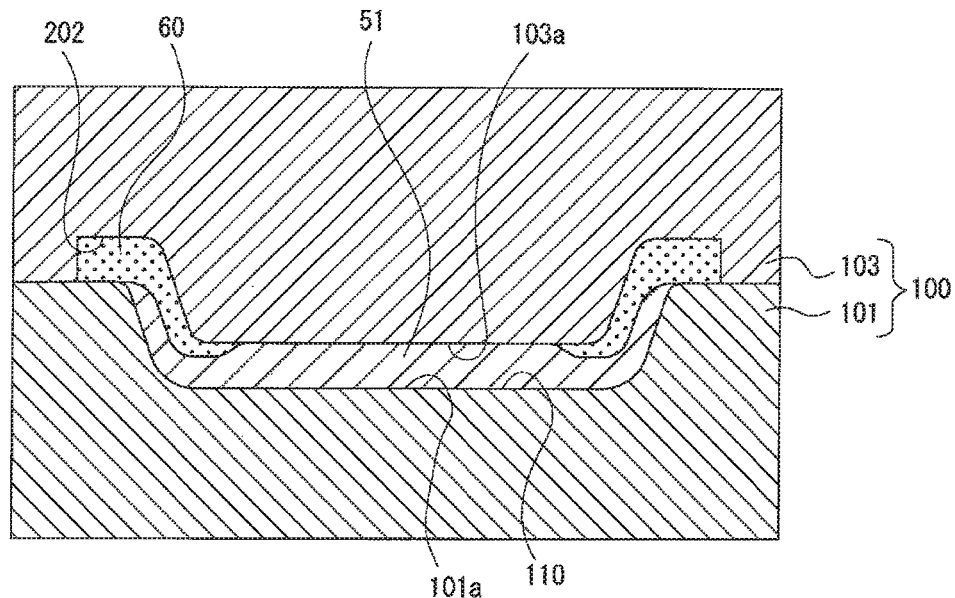
FIG. 3 continues to FIG. 2 and is a sectional view showing a state where a second molten resin is filled in a second cavity which is formed by clamping the cavity mold and a second core mold.
Figure 4:
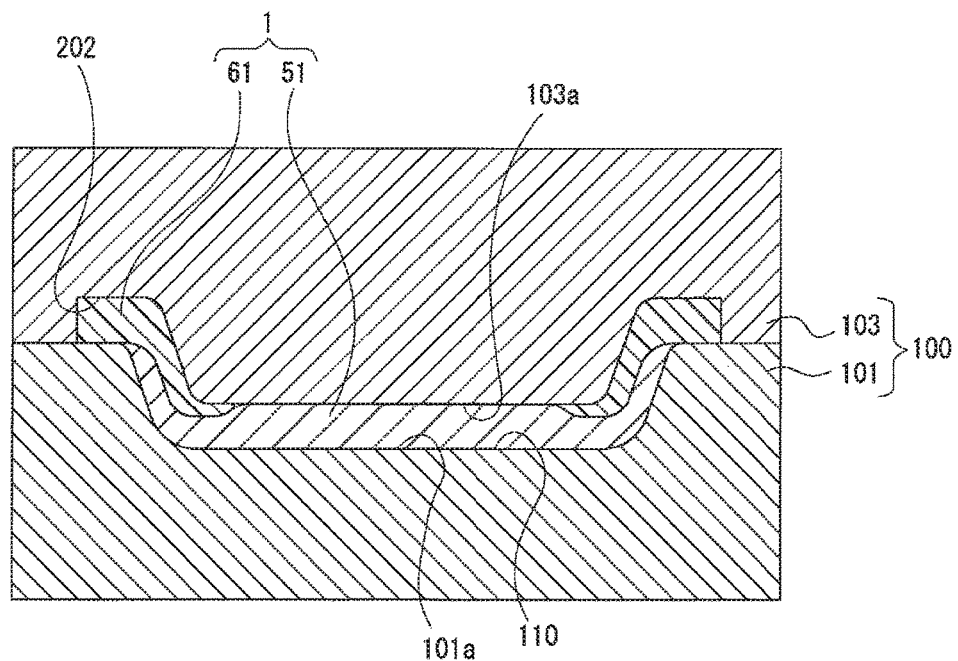
FIG. 4 continues to FIG. 3 and is a sectional view showing a state where the second molten resin is cooled, and thus, a resin-molded component is molded.

Hereinafter, an embodiment for carrying out the present invention will be described with reference to the accompanying drawings.

A resin-molded component 1 is used as a part of a vehicle lamp. For example, the resin-molded component 1 is used as a lamp housing having a light source disposed therein, a cover for covering the lamp housing, a reflector for reflecting light emitted from the light source, and an extension for achieving the improvement in appearance by shielding internal structures, and the like.

Hereinafter, the resin-molded component 1 used as a cover is described as an example.

The resin-molded component 1 is molded, by an injection molding, from a crystalline resin material such as polybutylene terephthalate (PBT), polyethylene terephthalate (PET) and polyacetal (POM) or a synthetic resin material thereof, for example. The resin-molded component 1 is molded by an injection molding using a mold 100. For example, the resin-molded component 1 is molded by a two-color molding using two kinds of materials.

Hereinafter, an example of a molding procedure of the resin-molded component 1 is schematically described (see FIGS. 1 to 4). In addition, in order to facilitate the understanding of the molding procedure, the mold 100 and the resin-molded component 1 are shown in a simplified manner in FIGS. 1 to 4.

As the mold 100, for example, a cavity mold 101 as a fixed mold, a first core mold 102 as a movable mold, and a second core mold 103 as a movable mold are used. The molding of the resin-molded component 1 is performed by a primary molding and a secondary molding. The cavity mold 101 is a mold which is used in both the primary molding and the secondary molding. The first core mold 102 is a dedicated mold which is used in the primary molding. The second core mold 103 is a dedicated mold which is used in the secondary molding.

First, the cavity mold 101 and the first core mold 102 are clamped to form a first cavity 201. A first molten resin 50 is filled into the first cavity 201 from a first gate (not shown) (see FIG. 1). The first molten resin 50 is, for example, a transparent resin. The first molten resin 50 filled is cooled and solidified, and thus, a first molding part 51 as a primary molded component is molded (see FIG. 2).

When the first molding part 51 is molded by the cooling of the first molten resin 50, the first molten resin 50 is shrunk in a constant degree with decreasing temperature. Therefore, a slight gap 110 is formed between a molding surface 101a of the cavity mold 101 and the first molding part 51.

Then, the first core mold 102 is opened with respect to the cavity mold 101, and the cavity mold 101 and the second core mold 103 are clamped to form a second cavity 202. In the state where the first molding part 51 is set, a second molten resin 60 is filled into the second cavity 202 from a second gate (not shown) (see FIG. 3). The second molten resin 60 is, for example, a colored resin such as a black resin. The second molten resin 60 filled is cooled and solidified, and thus, a second molding part 61 is molded (see FIG. 4). As the second molding part 61 is molded, the resin-molded component 1 as a secondary molded component is molded by the first molding part 51 and the second molding part 61.

Subsequently, the second core mold 103 is opened with respect to the cavity mold 101, and the resin-molded component 1 is taken out. The resin-molded component 1 is molded by joining a portion of the first molding part 51 and a portion of the second molding part 61. The joined portion is provided as a laminated portion 70.

The resin-molded component 1 has an outer surface 10 which is formed mainly by the molding surface 101a of the cavity mold 101 and an inner surface 11 which is formed mainly by a molding surface 102a of the first core mold 102 or a molding surface 103a of the second core mold 103.

Figure 5:
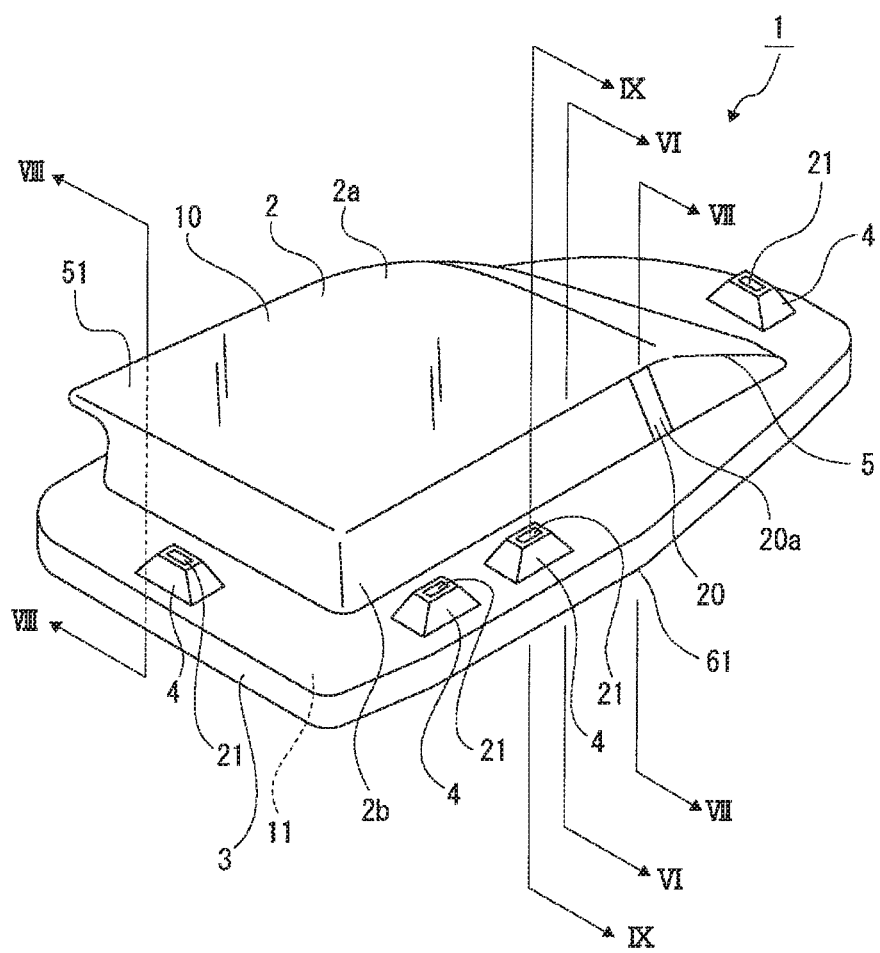
FIG. 5 is a perspective view of the resin-molded component.

Meanwhile, the resin-molded component 1 molded as described above has, for example, a cover part 2 which has a shape opened rearward and a flange part 3 which is flared outwardly from a rear end portion of the cover part 2 (see FIG. 5).

Figure 6:
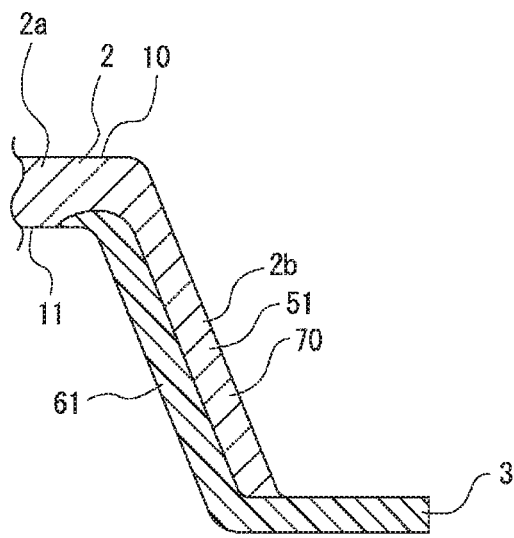
FIG. 6 is a sectional view taken along a line VI-VI shown in FIG. 5.
Figure 7:
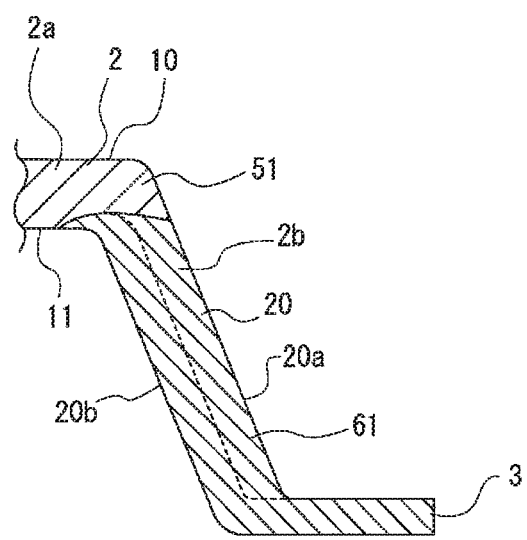
FIG. 7 is a sectional view taken along a line VII-VII shown in FIG. 5.

The cover part 2 has a front surface portion 2a and a peripheral surface portion 2b continuous to an outer peripheral edge of the front surface portion 2a. The front surface portion 2a is formed by the first molding part 51, and the peripheral surface portion 2b is formed by the laminated portion 70 in which the first molding part 51 and the second molding part 61 are laminated (see FIGS. 6 to 8), except for a part thereof.

Convex portions 4, 4, . . . protruding forward are provided in the flange part 3 so as to be circumferentially spaced (see FIG. 5). The convex portions 4, 4, . . . serve as a mounting portion for mounting the resin-molded component 1 to a bumper of a vehicle, or the like.

Figure 9:
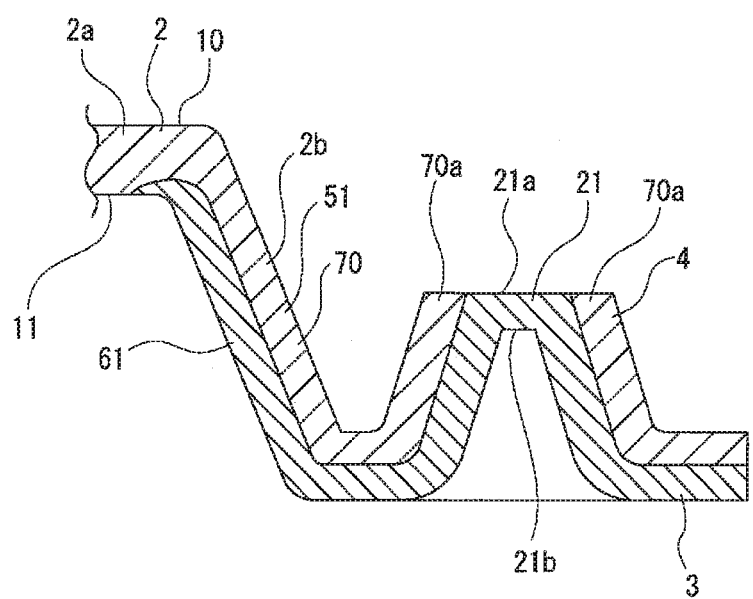
FIG. 9 is a sectional view taken along a line IX-IX shown in FIG. 5.

The flange part 3 has a portion formed as a portion of the second molding part 61 (see FIGS. 6 and 7) and a portion formed as the laminated portion 70 in which the first molding part 51 and the second molding part 61 are laminated (see FIG. 9). For example, portions of the flange part 3, on which the convex portions 4, 4, . . . are provided, are configured as the laminated portion 70.

In the resin-molded component formed by the two-color molding as described above, it is desirable to ensure the high bondability in the laminated portion and thus to achieve the improvement in strength thereof. However, since, as described above, the resin-molded component is molded by causing the second molten resin to flow in the state where the first molten resin is cooled, there is a risk that air bubbles occur between the first molding part and the second molten resin when the second molten resin is flowing. These air bubbles are occurred by air present in the cavity or gas generated from the molten resin, or the like. Particularly, the air bubbles are liable to occur in an end portion in the flowing direction of the second molten resin or a portion thereof flowing along a convex portion or concave portion of the primary molded component, or the like.

Therefore, in order to prevent air bubbles from occurring in the resin-molded component 1, each portion where air bubbles are liable to occur is configured as follows.

Figure 10:
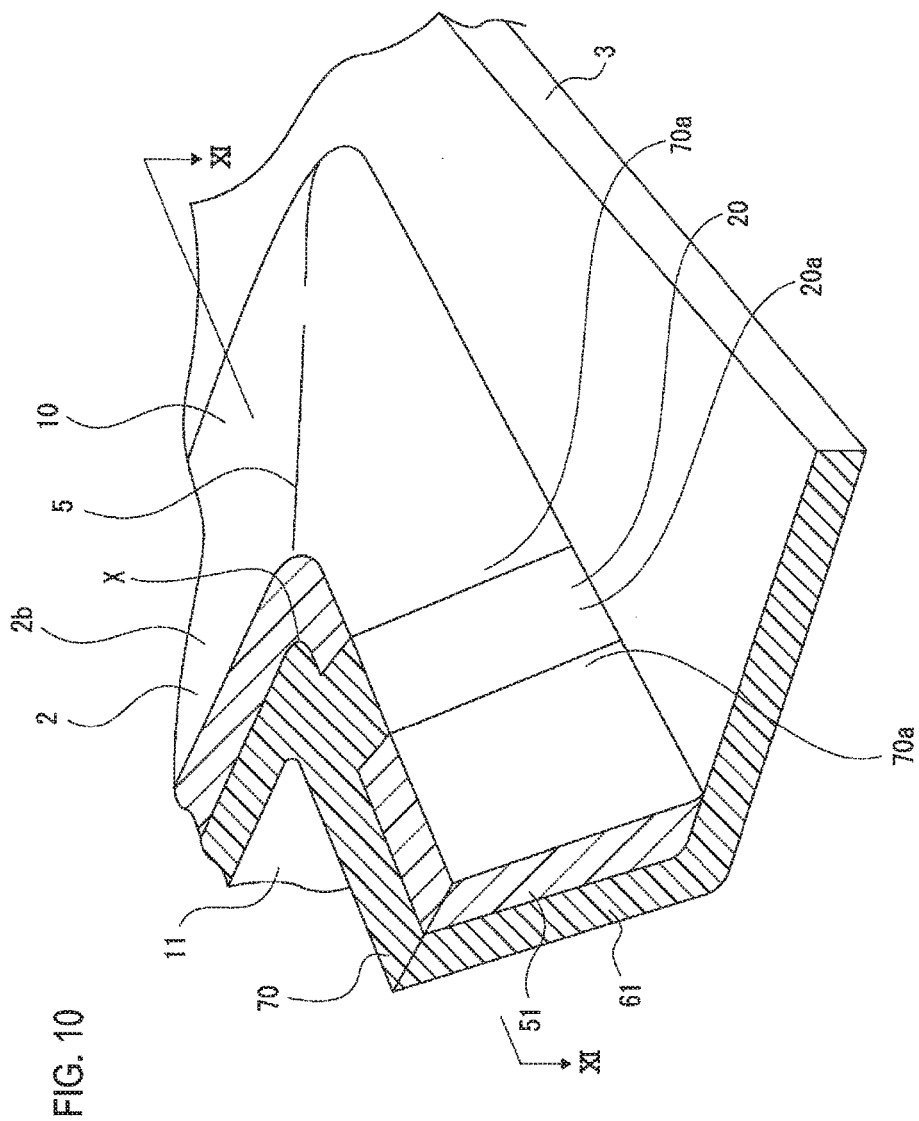
FIG. 10 is an enlarged perspective view showing a portion of the resin-molded component.
Figure 11:
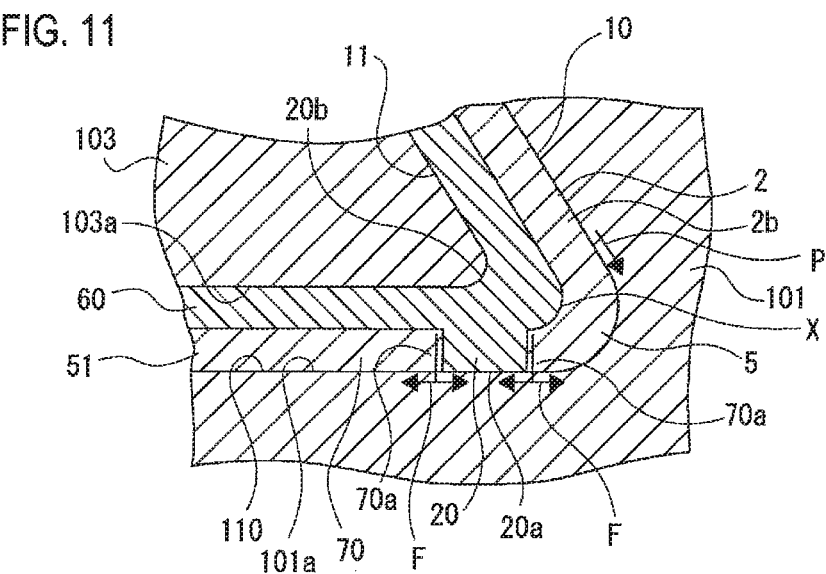
FIG. 11 is a sectional view taken along a line XI-XI shown in FIG. 10, in which the mold is shown together.

For example, the resin-molded component 1 has a sharp corner 5 in which the flowing direction of the molten resin is abruptly changed (see FIGS. 10 and 11). Since an escape passage for gas is not sufficient in the sharp corner 5, air bubbles are liable to occur in a boundary portion X between the first molding part 51 (first molten resin 50) and the second molding part 61 in the leading end portion of the sharp corner 5.

Figure 12:
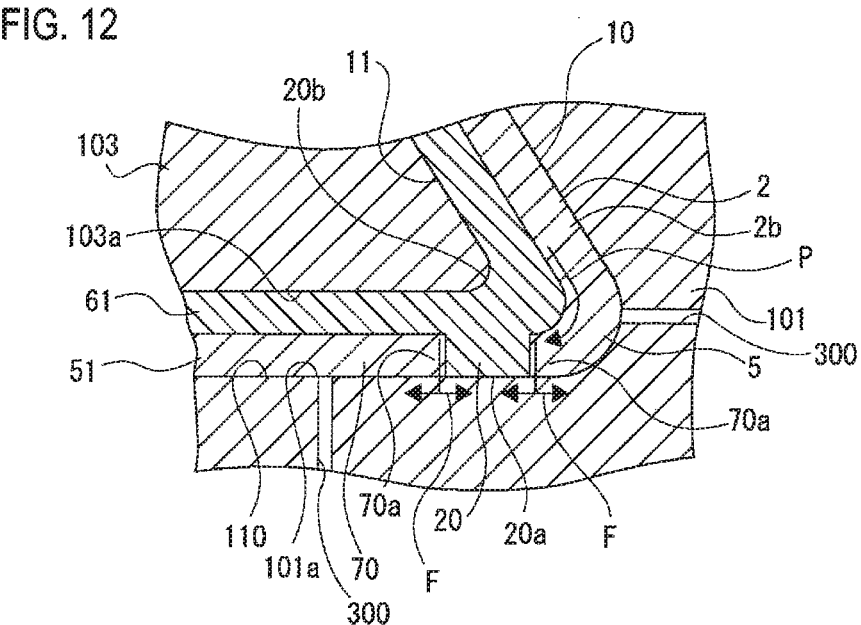
FIG. 12 is a sectional view showing an example where a discharge hole is formed in the mold.

In the resin-molded component 1, an exposed portion 20 is provided, as a portion of the second molten resin 60, at or near the sharp corner 5. For example, the exposed portion 20 is provided immediately after or immediate before the portion in which a flowing direction P of the second molten resin 60 is abruptly changed. The exposed portion 20 is a portion that is formed by causing a portion of the second molten resin 60 flowing along the molding surface 103a of the second core mold 103 to flow toward the molding surface 101a of the cavity mold 101. FIGS. 11 and 12 show an example where the exposed portion 20 is provided immediately after the portion in which the flowing direction P of the second molten resin 60 is abruptly changed. As a portion of the second molten resin 60 reaches the molding surface 101a, a one-side surface 20a (leading end surface) of the exposed portion 20 is formed by the molding surface 101a.

Therefore, the resin-molded component 1 is configured such that each of portions 70a, 70a of the laminated portion 70 is located at least on opposite sides across the exposed portion 20. The one-side surface 20a of the exposed portion 20 in the laminated direction of the laminated portion 70 is configured as a portion of the outer surface 10 and the other-side surface 20b thereof is configured as a portion of the inner surface 11.

By providing such exposed portion 20, air or gas or the like during the flowing of the second molten resin 60 is pushed toward the molding surface 101a by the portion of the second molten resin 60 forming the exposed portion 20. In this way, the air or gas or the like flows along a path F through a gap 110 formed between the molding surface 101a of the cavity mold 101 and the first molten resin 50.

Therefore, in the resin-molded component 1, the gas during the flowing of the second molten resin 60 in the second cavity 202 is pushed toward the molding surface 101a of the cavity mold 101 by the second molten resin 60. In this way, air bubbles are prevented from occurring between the first molding part 51 and the second molding part 61 and the high bondability between the first molding part 51 and the second molding part 61 is ensured, so that the strength of the resin-molded component 1 is improved. As a result, it is possible to achieve the improvement in formability of the resin-molded component 1.

In addition, the mold 100 may be configured such that a discharge hole 300 is formed, as a discharge passage of gas flowing along the path F, in the cavity mold 101 (see FIG. 12). By forming the discharge hole 300, the high discharging efficiency of gas from the mold 100 can be ensured.

Further, as described above, the resin-molded component 1 is used, for example, as a cover of a vehicle lamp and is desirably designed to appear colored (black) in the state where the peripheral surface portion 2b of the cover portion 2 is visually recognized from an outer peripheral side. However, since the exposed portion 20 is formed by the colored resin even when the exposed portion 20 is provided, the design in which the entire of the peripheral surface portion 2b appears colored in the state where the peripheral surface portion 2b is visually recognized from the outer peripheral side is ensured.

Figure 13:
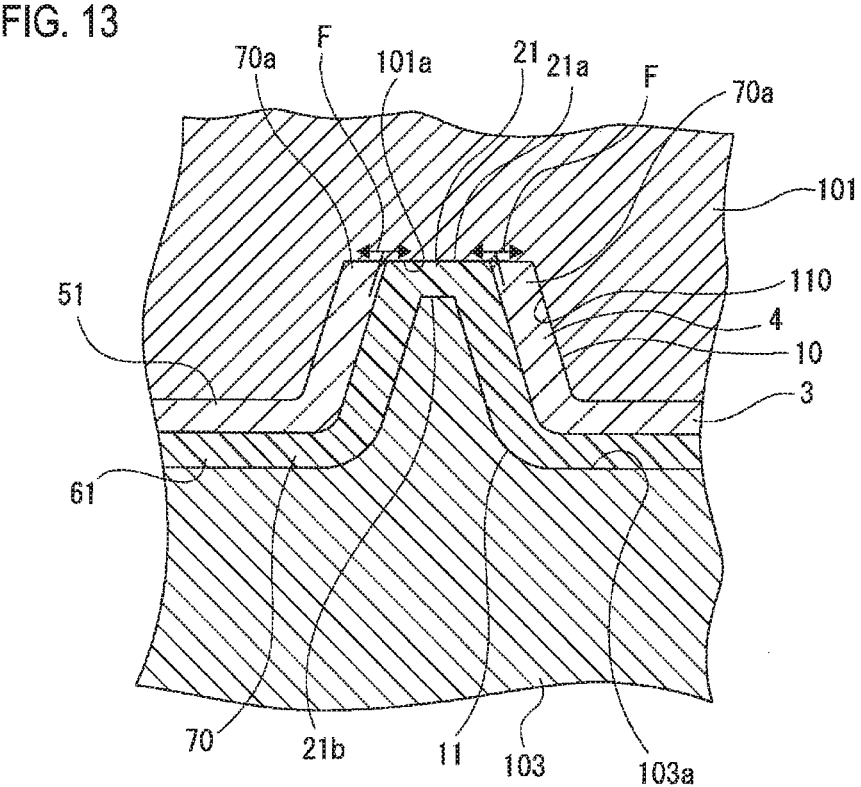
FIG. 13 is a sectional view showing a convex portion or the like, together with the mold.

Further, as described above, the resin-molded component 1 is provided with the convex portions 4 in which the flowing direction of the molten resin is abruptly changed (see FIGS. 9 and 13). When the first molding part and the second molding part are laminated over the entire of the convex portion 4, an escape passage for gas during the flowing of the second molten resin is not sufficient, and thus, air bubbles are liable to occur in a boundary portion between the first molding part and the second molding part.

Therefore, in the resin-molded component 1, an exposed portion 21 is provided, as a portion of the second molding part 61, in the convex portion 4 in which the flowing direction of the second molten resin 60 is abruptly changed and which protrudes to one side. In addition, the exposed portion 21 may be provided, as a portion of the second molding part 61, in a concave portion in which the flowing direction of the second molten resin 60 is abruptly changed and which is opened to one side.

The exposed portion 21 is provided at a leading end portion of the convex portion 4 and is formed by causing a portion of the second molten resin 60 flowing along the molding surface 103a of the second core mold 103 to flow toward the molding surface 101a of the cavity mold 101. As a portion of the second molten resin 60 reaches the molding surface 101a, a one-side surface 21a (leading end surface) of the exposed portion 21 is formed by the molding surface 101a.

Therefore, the resin-molded component 1 is configured such that each of the portions 70a, 70a, . . . of the laminated portion 70 is located around the exposed portion 21. The one-side surface 21a of the exposed portion 21 in the laminated direction of the laminated portion 70 is configured as a portion of the outer surface 10 and the other-side surface 21b thereof is configured as a portion of the inner surface 11.

By providing such exposed portion 21, air or gas or the like during the flowing of the second molten resin 60 is pushed toward the molding surface 101a by the portion of the second molten resin 60 forming the exposed portion 21. In this way, the air or gas or the like flows along the path F through the gap 110 formed between the molding surface 101a of the cavity mold 101 and the first molten resin 50.

Therefore, in the resin-molded component 1, the gas during the flowing of the second molten resin 60 in the second cavity 202 is pushed toward the molding surface 101a of the cavity mold 101 by the second molten resin 60. In this way, air bubbles are prevented from occurring between the first molding part 51 and the second molding part 61 and the high bondability between the first molding part 51 and the second molding part 61 is ensured, so that the strength of the resin-molded component 1 is improved. As a result, it is possible to achieve the improvement in formability of the resin-molded component 1.

In particular, since the exposed portion 21 is provided in the convex portion or the concave portion in which the flowing direction of the second molten resin 60 is abruptly changed, the exposed portion 21 is provided at the portion between the first molding part 51 and the second molding part 61, in which air bubbles are liable to occur. In this way, the air bubbles are sufficiently expelled from the portion between the first molding part 51 and the second molten resin 60, and thus, the resin-molded component 1 with high bondability can be molded.

In addition, the mold 100 may be configured such that the discharge hole 300 is formed, as a discharge passage of gas flowing along the path F, in the cavity mold 101, similar to the case of the sharp corner 5. By forming the discharge hole 300, the high discharging efficiency of gas from the mold 100 can be ensured.

Figure 14:
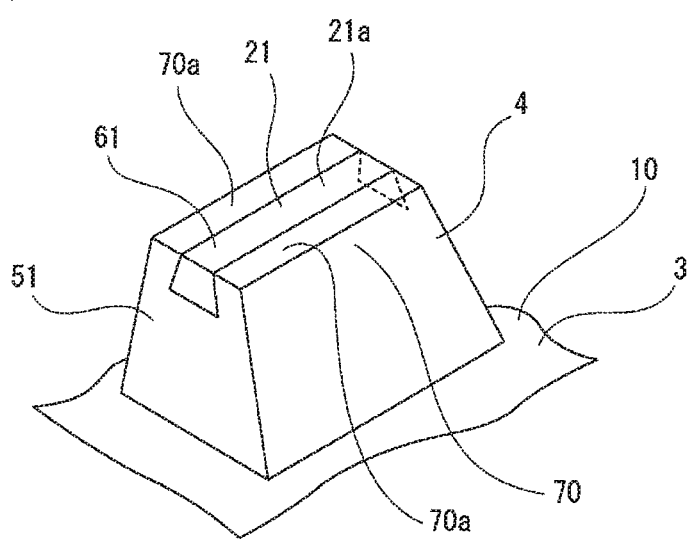
FIG. 14 is a perspective view showing another example of the convex portion.
Figure 15:
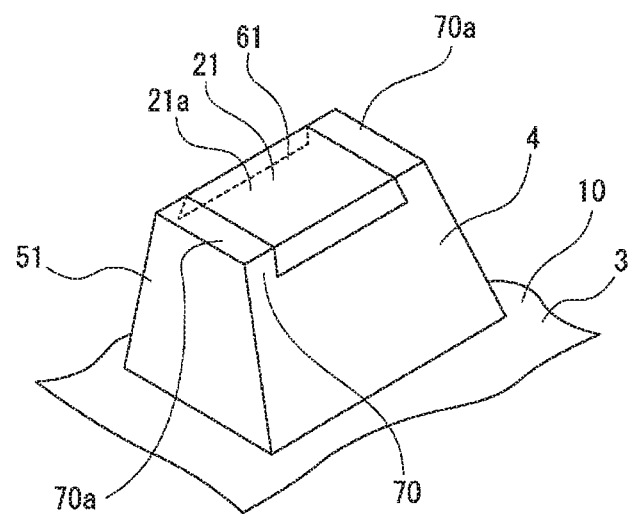
FIG. 15 is a perspective view showing yet another example of the convex portion.
Figure 16:
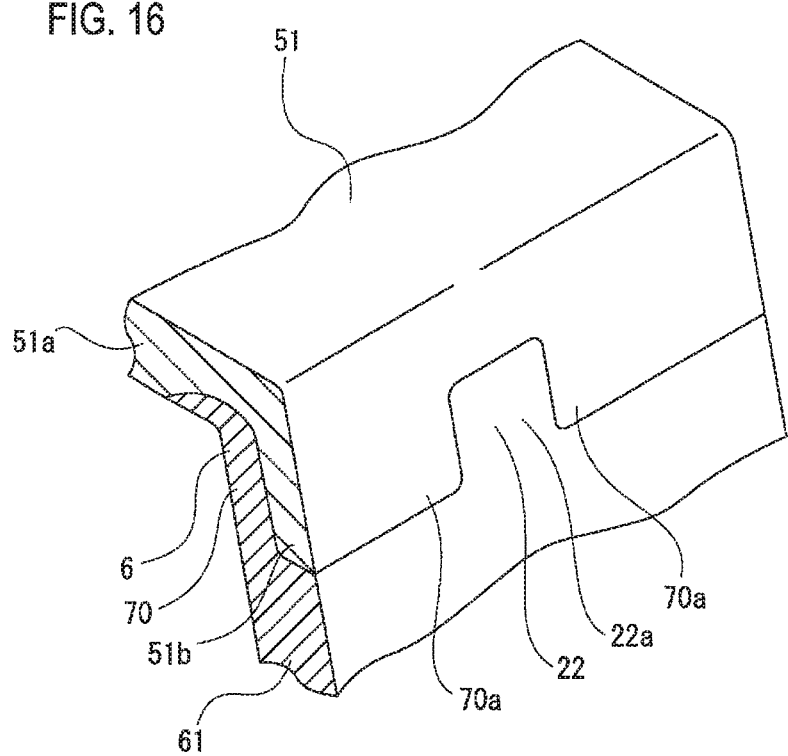
FIG. 16 is a perspective view showing an example where an exposed portion is provided in an end portion.
Figure 17:
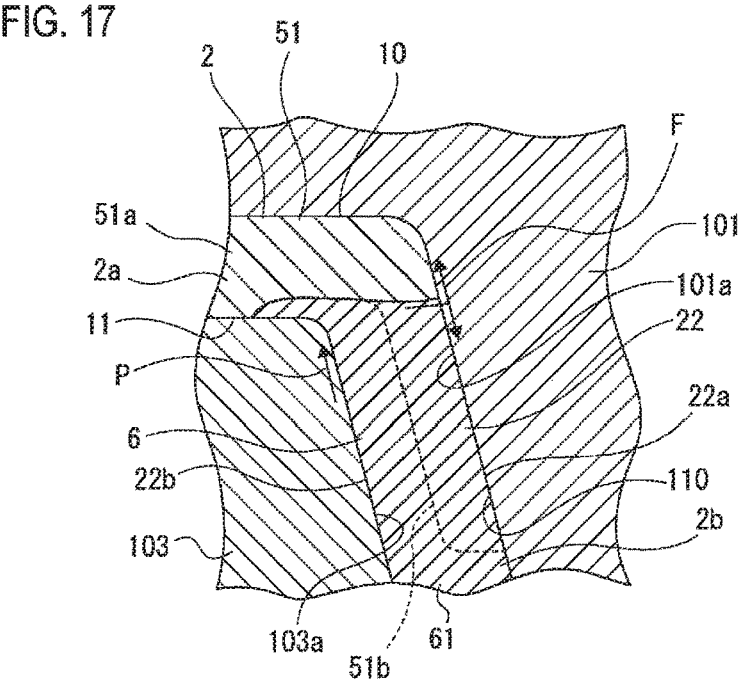
FIG. 17 is a sectional view showing an example where the exposed portion is provided in the end portion, together with the mold.

Further, in the foregoing, the exposed portion 21 around which each of the portions 70a, 70a, . . . of the laminated portion 70 is located has been illustrated as an example. However, for example, the resin-molded component 1 may be configured such that each of the portions 70a, 70a of the laminated portion 70 is located only on opposite sides across the exposed portion 21 (see FIGS. 14 and 15).

With this configuration, the area of the second molten resin 60 reaching the molding surface 101a is increased, and thus, gas is further easily pushed toward the molding surface 101a. Therefore, the higher bondability between the first molding part 51 and the second molding part 61 is ensured, and thus, the strength of the resin-molded component 1 is further improved. In this way, it is possible to further improve the formability of the resin-molded component 1.

Further, since air bubbles are liable to occur also in an end portion in the flowing direction of the second molten resin 60, it is desirable to provide an exposed portion 22 (which is configured as follows) in the end portion in the flowing direction P of the second molten resin 60. In addition, as an example, a case will be described below in which the second molten resin 60 flows along the first molding part 51 molded by the cooling of the first molten resin 50, and the first molding part 51 blocks the second molten resin 60 flowing to provide an end portion 6.

The first molding part 51 has a thick-walled portion 51a having a large thickness and a thin-walled portion 51b thinner than the thick-walled portion 51a. The first molding part 51 is formed in the state where the thick-walled portion 51a and the thin-walled portion 51b are bent. In addition, the thick-walled portion 51a and the thin-walled portion 51b are provided as an example for explaining the exposed portion 22 and are omitted in the resin-molded component 1 shown in FIG. 5.

The second molten resin 60 flows toward the leading end portion of the thin-walled portion 51b and the end portion 6 in the flowing direction P is provided, as a portion of the second molding part 61, on an inner surface side of the thin-walled portion 51b. The exposed portion 22 is provided in the end portion 6 and is formed by causing a portion of the second molten resin 60 flowing along the molding surface 103a of the second core mold 103 to flow toward the molding surface 101a of the cavity mold 101. As a portion of the second molten resin 60 reaches the molding surface 101a, a one-side surface 22a of the exposed portion 22 is formed by the molding surface 101a.

Therefore, the resin-molded component 1 is configured such that each of the portions 70a, 70a of the laminated portion 70 is located at least on opposite sides of the exposed portion 22. The one-side surface 22a of the exposed portion 22 in the laminated direction of the laminated portion 70 is configured as a portion of the outer surface 10 and the other-side surface 22b thereof is configured as a portion of the inner surface 11.

By providing such exposed portion 22, air or gas or the like during the flowing of the second molten resin 60 is pushed toward the molding surface 101a by the portion of the second molten resin 60 forming the exposed portion 22. In this way, the air or gas or the like flows along the path F through the gap 110 formed between the molding surface 101a of the cavity mold 101 and the first molten resin 50.

Therefore, in the resin-molded component 1, the gas during the flowing of the second molten resin 60 in the second cavity 202 is pushed toward the molding surface 101a of the cavity mold 101 by the second molten resin 60. In this way, air bubbles are prevented from occurring between the first molding part 51 and the second molding part 61 and the high bondability between the first molding part 51 and the second molding part 61 is ensured, so that the strength of the resin-molded component 1 is improved. As a result, it is possible to achieve the improvement in formability of the resin-molded component 1.

In particularly, since the exposed portion 22 is provided in the end portion 6 in the flowing direction P of the second molten resin 60, the exposed portion 22 is provided at the portion between the first molding part 51 and the second molding part 61, in which air bubbles are liable to occur. In this way, the air bubbles are sufficiently expelled from the portion between the first molding part 51 and the second molten resin 60, and thus, the resin-molded component 1 with high bondability can be molded.

In addition, the mold 100 may be configured such that the discharge hole 300 is formed, as a discharge passage of gas flowing along the path F, in the cavity mold 101, similar to the case of the sharp corner 5. By forming the discharge hole 300, the high discharging efficiency of gas from the mold 100 can be ensured.

Figure 18:
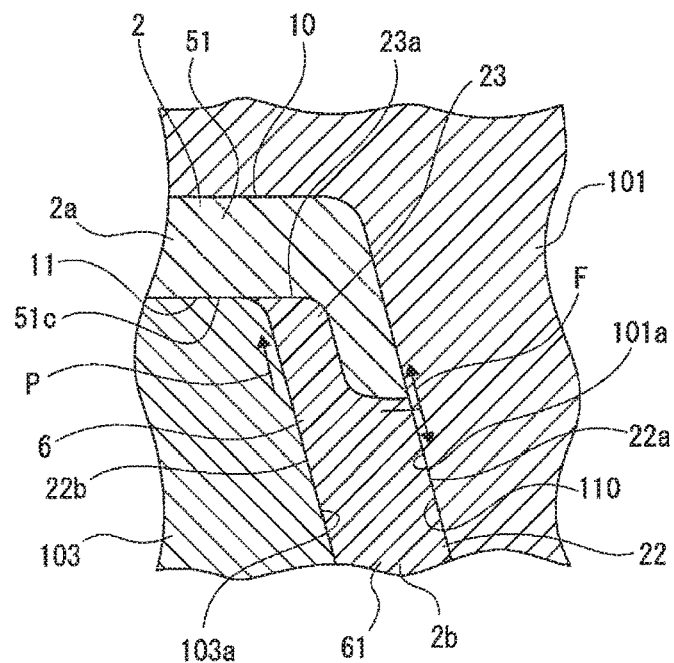
FIG. 18 is a sectional view showing an example where a leading end surface of the exposed portion is located on the same plane as an inner surface of the first molding part, together with the mold.

Further, in the resin-molded component 1, it is desirable that the leading end portion 23 of the exposed portion 22 is not inserted into the first molding part 51 and a leading end surface 23a is located on the same plane as an inner surface 51c of the first molding part 51 (see FIG. 18). When the leading end surface 23a is located on the same plane as the inner surface 51c, gas is easily pushed out by the second molten resin 60 flowing and is difficult to remain between the first molding part 51 and the leading end surface 23a. Therefore, air bubbles are prevented from occurring between the first molding part 51 and the second molding part 61, and thus, it is possible to further improve the formability of the resin-molded component 1.

Figure 19:
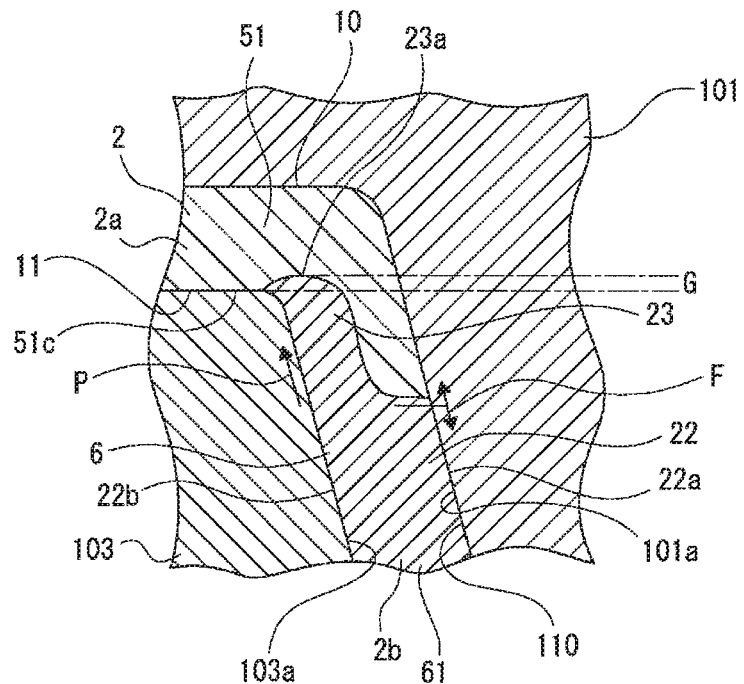
FIG. 19 is a sectional view showing an example where a leading end portion of the exposed portion is inserted into the first molding part, together with the mold.

In addition, even in the configuration that the leading end portion 23 of the exposed portion 22 is inserted into the first molding part 51, it is desirable that an insertion amount G of the leading end portion 23 into the first molding part 51 is small, as shown in FIG. 19. For example, the insertion amount G is preferably equal to or less than 0.5 mm. When the insertion amount G of the leading end portion 23 into the first molding part 51 is small, the gas is easily pushed out by the second molten resin 60 flowing. Therefore, air bubbles are prevented from occurring between the first molding part 51 and the second molding part 61, and thus, it is possible to achieve the improvement in formability of the resin-molded component 1.

Meanwhile, in the foregoing, an example has been illustrated in which the exposed portions 20, 21, 22 are provided at or near the sharp corner 5, the convex portion 4 and the end portion 6, respectively. The positions where the exposed portions are provided are limited to these positions. The exposed portions can be provided at respective positions where air bubbles are liable to occur, such as the position where the flowing direction of the second molten resin 60 is changed or the position where the flow velocity of the second molten resin 60 is decreased.

As described above, in the resin-molded component 1, portions of the second molding part 61 are provided as the exposed portions 20, 21, 22, each of the portions 70a, 70a, . . . of the laminated portion 70 is located at least on opposite sides across the exposed portions 20, 21, 22, and the one-side surfaces 20a, 21a, 22a of the exposed portions 20, 21, 22 in the laminating direction of the laminated portions 7C are configured as portions of the outer surface 10 and the other-side surfaces 20b, 21b, 22b thereof are configured as portions of the inner surface 11.

Therefore, since the gas during the flowing of the second molten resin 60 in the second cavity 202 is pushed toward the molding surface 101a of the cavity mold 101 by the second molten resin 60, air bubbles are prevented from occurring between the first molding part 51 and the second molding part 61 and the high bondability between the first molding part 51 and the second molding part 61 is ensured, so that the strength of the resin-molded component 1 is improved. As a result, it is possible to achieve the improvement in formability of the resin-molded component 1.

Further, since the occurrence of air bubbles are prevented in the resin-molded component 1, air bubbles are not visually recognized through the first molding part 51 which is transparent. Therefore, the appearance is not damaged, thereby improving the design and ensuring high merchantability.

Furthermore, since the transparent resin is used as the first molten resin 50 and the colored resin is used as the second molten resin 602, a transparent portion, a colored portion and the laminated portion 70 are formed in the resin-molded component 1. In addition, it is possible to mold the resin-molded component 1 in which a required portion is displayed by a desired color while ensuring the high bondability between the first molding part 51 and the second molding part 61 in the laminated portion 70.

In addition, in the case of the resin-molded component 1 molded by the two-color molding, the second molten resin 60 goes around to the leading end side of the first molten resin 50 in the laminated portion 70 when the shrinkage rate of the first molten resin 50 is large. Thus, there is a risk that a portion of the second molding part 61 is exposed to the first molding part 51 side in the state where the first molten resin 50 and the second molten resin 60 are cooled.

Figure 8:
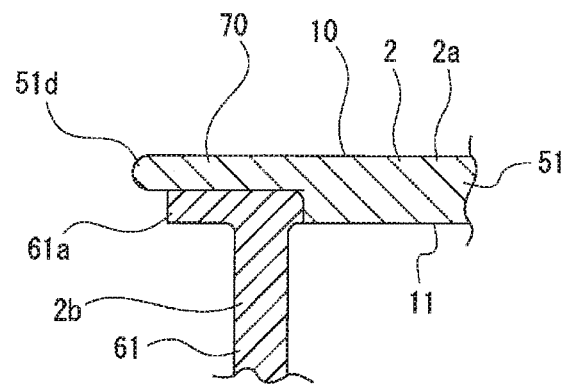
FIG. 8 is a sectional view taken along a line VIII-VIII shown in FIG. 5.

Therefore, in the resin-molded component 1, as shown in FIG. 8, a leading end portion of the first molten resin 50 is previously projected from a leading end portion of the second molten resin 60 by a certain amount. In this way, even when the shrinkage rate of the first molten resin 50 is large, the second molten resin 60 does not go around to the first molten resin 50 side, so that the second molding part 61 is prevented from being exposed to the first molding part 51 side.

However, depending on the shrinkage rate of the first molten resin 50, a leading end portion 51d of the first molding part 51 is in a state of being projected from a leading end portion 61a of the second molding part 61 in the state where the laminated portion 70 is formed. Accordingly, the leading end portion 51d of the first molding part 51 looks like a see-through thing when seen from the outside, and thus, the second molding part 61 that is an inner colored portion is not seen. Thus, there is a risk that the design properties are degraded.

Figure 20:
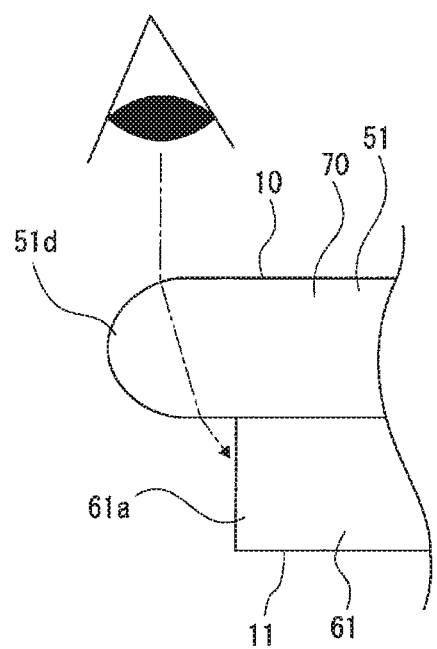
FIG. 20 is a sectional view showing a state where the surface of the leading end portion of the first molding part is formed in a curved surface.

In the resin-molded component 1, the surface of the leading end portion 51d of the first molding part 51 is formed in a curved shape, for example, a hemispherical shape in order to prevent such degradation in the design properties. By forming the surface of the leading end portion 51d in the curved shape, as shown in FIG. 20, the second molding part 61 that is the inner colored portion is visually recognized when the leading end portion 51d is visually recognized from the outside by the refraction of light in the leading end portion 51d. In this way, it is possible to achieve the improvement in the design properties.

What is claimed is:

1. A resin-molded component which is molded by filling a second molten resin in the state where a first molten resin is filled in a cavity of a mold and then cooled,
the resin-molded component comprising:
a first molding part molded by solidifying the first molten resin; and
a second molding part molded by solidifying the second molten resin,
wherein a portion of the first molding part and a portion of the second molding part are laminated in a direction connecting an outer surface and an inner surface of the resin-molded component to provide a laminated portion,
a portion of the second molding part is provided as an exposed portion,
portions of the laminated portion are located only on opposite sides across the exposed portion,
a one-side surface of the exposed portion in the laminating direction of the laminated portion is configured as a portion of the outer surface and the other-side surface thereof is configured as a portion of the inner surface,
the area of the one-side surface of the exposed portion is smaller than the area of a one-side surface of the first molding part configured as a portion of the outer surface, and
a convex portion protruding to one side or a concave portion opened to one side is formed and the exposed portion is provided in the convex portion or the concave portion.

2. The resin-molded component according to claim 1, wherein the first molten resin is a transparent resin and the second molten resin is a colored resin.

3. The resin-molded component according to claim 1, wherein the exposed portion is provided in an end portion in a flowing direction of the second molten resin flowing when filled into the cavity.

4. A resin-molded component comprising:
a first molding part; and
a second molding part,
wherein the resin-molded component has a laminated portion where a portion of the first molding part and a portion of the second molding part are laminated in a direction connecting an outer surface and an inner surface of the resin-molded component,
the resin-molded component has an exposed portion of the second molding part where the first molding part and the second molding part are not laminated, and a one-side surface of the exposed portion in the laminating direction of the laminated portion is configured as a portion of the outer surface and the other-side surface thereof is configured as a portion of the inner surface,
the area of the one-side surface of the exposed portion is smaller than the area of a one-side surface of the first molding part configured as a portion of the outer surface,
the exposed portion is sandwiched by portions of the laminated portion, and
a convex portion protruding to one side or a concave portion opened to one side is formed and the exposed portion is provided in the convex portion or the concave portion.

\* \* \* \* \*